Nov. 3, 1970          A. D. F. GERDS          3,537,195
FRAUD PROOF CREDIT CARD
Filed July 1, 1968

INVENTOR.
ADOLPH D. F. GERDS
BY LIONEL V. TEFFT
Attorney

United States Patent Office 3,537,195
Patented Nov. 3, 1970

3,537,195
FRAUD PROOF CREDIT CARD
Adolph D. F. Gerds, Apple Valley, Calif., assignor to Gerds Associates, Apple Valley, Calif., an unincorporated association
Filed July 1, 1968, Ser. No. 741,721
Int. Cl. G09f 3/02
U.S. Cl. 40—2.2                                 2 Claims

ABSTRACT OF THE DISCLOSURE

A unitary flat rectangular credit card having the customer's name and serial number embossed thereon for printing the same on sales tickets in the conventional manner, a validating corner tab embodied with the card also having said name and number embossed thereon and being die severed from the balance of the card excepting for readily frangible connecting webs, said corner tab being apertured for carrying the same on a key chain after its being fully separated from said card.

---

One of the objects of the invention is in the provision of a special type credit card that prevents use of lost or stolen cards and obviates any possibility of fraud or use.

Another object of the invention is to provide a credit card that requires a matching of dual parts to positively insure customer identification and increase safety of use and obviates any comparison of signature identification.

Still another object of the invention is in the provision of a separate element credit card which upon matching identifies the customer and impresses the number on the mind of the seller in making his decision for further credit record check.

Yet another object of the invention is to provide a credit card that is simple of use and at the same time aids in customer recognition and credit capability.

The issuance of credit cards in such tremendous volume and latitude has resulted in much abuse of the privilege. It is impossible to explain the many ways that companies securing these cards have been victimized. Let us take the operator of a filling station as an example. He knows many of his customers, but not all. He has a lengthy list of card holding delinquents that takes much of his time to consider or study for each case. He is handed the usual or conventional embossed name and number credit card and is many times in a dilema as to customer recognition and credit standing.

Applicant provides a dual matching type card in which the embossed name and number are on both elements. The main card is in rather, but not exactly, conventional form. The main card is presented to the station attendant. If he knows the customer, the sales transaction is easily accomplished. If there is any question of recognition, the attendant requests the separted matching part of the cut-a-way main portion. The smaller portion is of course carried separately, on a key chain or elsewhere, and is produced to insure ownership. If the separated element is not produced, the attendant senses fraud or mistake. He is bound to keep the card and return it to the insurer company and may receive some reward.

There is another feature in that the arrangement of numbers in duplicate adjacent position makes identification quick and impresses the number on the attendant's mind in case he makes a mental or actual check of delinquent credit numbers.

These and other objects and advantages of the present invention will become apparent to those skilled in the art upon consideration of the following detailed description of the preferred embodiment thereof, reference being made to accompanying drawings, herewith wherein.

Figure 1:
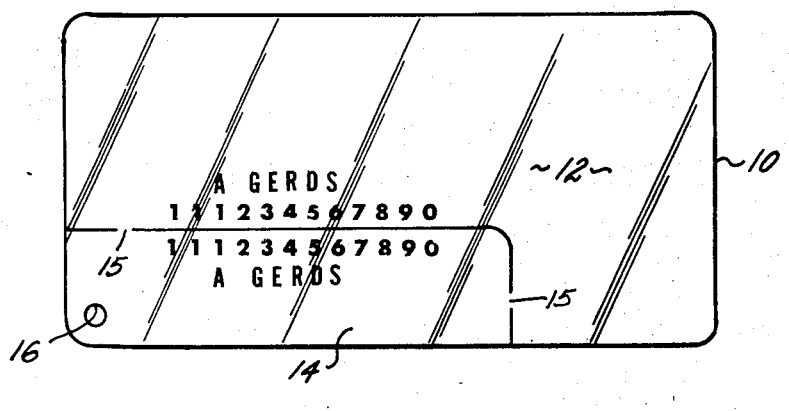
FIG. 1 is a plan view of the die cut embossed credit card with the smaller matching element not detached.
Figure 2:
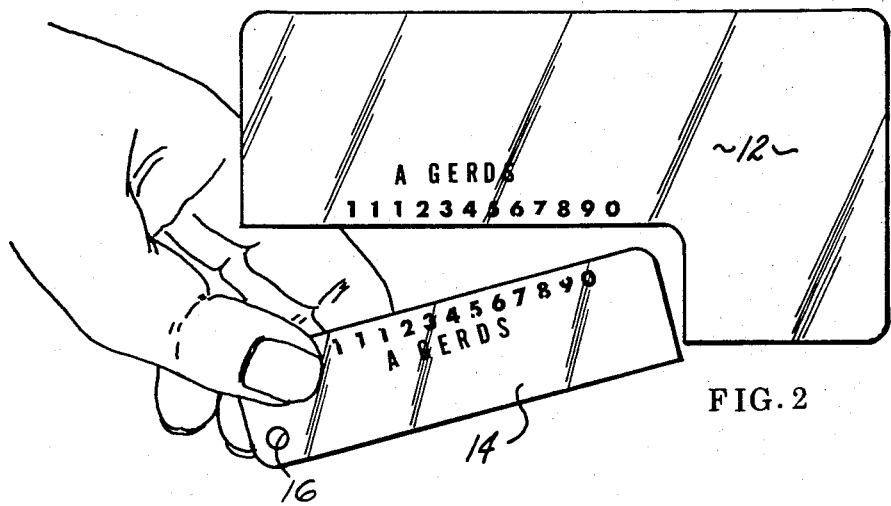
FIG. 2 is a similar view with the cut out portion torn from the main card.
Figure 3:
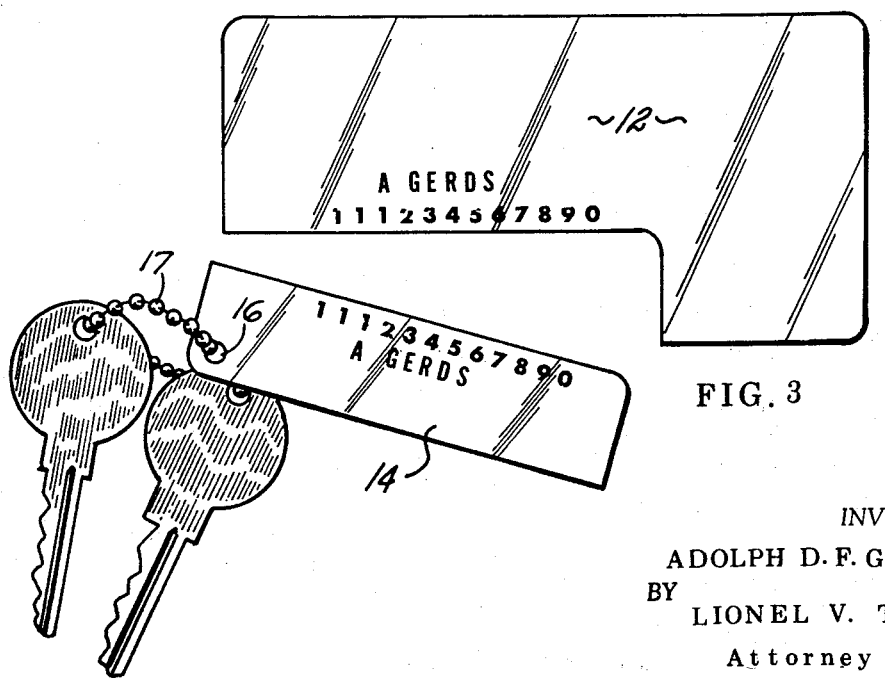
FIG. 3 is a view similar to FIG. 2 with the small matching portion connected to a key chain.

A preferred embodiment of the invention is shown in the drawing although other matching arrangements accomplishing the same result might well be used. There has been no effort in the drawings to indicate the company issuing and insuring the credit card. Suffice it to say that the name of any company or bank will be placed on the card with varied kinds of directions and responsibilities as the case may be. It is important that the number be adjacent the cut-a-way portion for quick identification.

A conventional credit card is shown at 10 and it may be of plastic or any other suitable and durable material. The card 10 is formed in two parts, the main card 12 containing insurer identification and embossed owner's name and serial number, and the matching cut-a-way identifying portion 14. The portion 14 is normally attached to the main card 12 but is torn therefrom for separated containment by the owner. The separate matching element 14 is also embossed with the owner's name and the number is placed on the edge thereof to lie immediately adjacent the number on the main card for easy and rapid comparison. An aperture 16 is provided in matching element 14 for the precise purpose of carrying this element on the key ring or chain 17 of the customer. As credit cards are conventionally carried in one's billfold and the latter is stored in a separate pocket from one's keys, it is extremely unlikely that both the credit card 12 and the matching element 14 will ever be both lost to the card owner at the same time and thus become jointly usable by another individual to purchase goods without the card owner's authority.

While I have described in considerable detail what I believe to be the preferred form of my invention, it will be understood by those skilled in the art that various changes may be made in the shape and arrangement of the several parts without departing from the broad scope of my invention as defined in the following claims.

I claim:
1. A fraud proof credit card comprising:
   a unitary flat approximately rectangular card of plastic material and of uniform thickness;
   the customer's name and serial number being embossed in a given area on said card and parallel with a longitudinal edge of said card for use in printing the same on sales tickets covering purchases made on said card;
   the customer's name and serial number also being embossed on said card in another area thereof located in one of the corners of said card and also parallel with said longitudinal edge for use solely for identifying said card by direct occular comparison as belonging to said customer;
   said corner area being at least partially die severed from the balance of said card along a line extending between said first mentioned embossing and said last mentioned embossing to facilitate the separation of said corner area from said card to form a customer identifying tab,
   said tab being apertured for the express purpose of carrying the same on a key chain when so separated, said tab being neither required nor adapted to be united with said card in the printing of said sales ticket.

2. A credit card as recited in claim 1 wherein said first mentioned embossing and said last mentioned embossing are juxtaposed directly opposite each other on opposite sides of said line of severance separating said tab from said card to facilitate ready occular comparison of said two embossings when said tab is assembled in its original relation with said card.

References Cited
UNITED STATES PATENTS

| | | | |
|---|---|---|---|
| 1,560,047 | 11/1925 | Edwards | 283—7 |
| 1,089,154 | 3/1914 | Portmore | 40—2 |
| 1,332,421 | 3/1920 | Bogardus | 40—2 |
| 2,121,865 | 6/1938 | Flood | 40—2 X |
| 3,283,713 | 11/1966 | Wooster | 101—369 |
| 3,287,839 | 11/1966 | Rotwein et al. | 283—7 X |
| 3,434,414 | 3/1969 | Wright et al. | 40—2.2 X |
| 3,478,683 | 11/1969 | Hopkins. | |

W. J. CONTRERAS, Assistant Examiner

EUGENE R. CAPOZIO, Primary Examiner